United States Patent [19]

Kobayashi et al.

[11] Patent Number: 4,502,247
[45] Date of Patent: Mar. 5, 1985

[54] GUIDE RAIL FOR A WINDOW REGULATOR AND SLIDE GUIDE MECHANISM EMPLOYING THE SAME

[75] Inventors: Tetuo Kobayashi, Ikeda; Katuyoshi Ohgaki, Osaka, both of Japan

[73] Assignee: Nippon Cable System Inc., Hyogo, Japan

[21] Appl. No.: 370,047

[22] Filed: Apr. 20, 1982

[30] Foreign Application Priority Data

Feb. 23, 1982 [JP] Japan .................................. 57-28676
Feb. 23, 1982 [JP] Japan .............................. 57-25473[U]

[51] Int. Cl.$^3$ ............................................ E05F 11/48
[52] U.S. Cl. ........................................ 49/352; 49/374
[58] Field of Search ........................ 49/352, 374, 375

[56] References Cited

U.S. PATENT DOCUMENTS

3,162,281 12/1964 Kraska et al. ........................... 49/374
3,427,748 2/1969 Marr .
4,237,656 12/1980 Hess et al. ............................... 49/352

FOREIGN PATENT DOCUMENTS

2532458 7/1975 Fed. Rep. of Germany ........ 49/352
2080411 2/1982 United Kingdom .................. 49/348

Primary Examiner—Kenneth Downey
Attorney, Agent, or Firm—Armstrong, Nikaido, Marmelstein & Kubovcik

[57] ABSTRACT

A guide rail for a window regulator which is light in weight and is high in rigidity, being formed from a hoop plate and having a double-bending portion which is raised at almost right angle with the hoop plate and in the longitudinal direction of the hoop plate. Furthermore, a slide-guide mechanism for a window regulator which is light and in which play is small when it is slidably moved, comprising the guide rail and a bracket which is slidably guided along the guide rail. The bracket has slide shoes arranged zigzag along the double-bending portion of the guide rail and provided with an oil groove on a side face coming into contact with the double-bending portion, and a guide shoe having a face to guide both side edges of the guide rail secondarily and a fitting member for securing a wire.

6 Claims, 18 Drawing Figures

GUIDE RAIL FOR A WINDOW REGULATOR AND SLIDE GUIDE MECHANISM EMPLOYING THE SAME

BACKGROUND OF THE INVENTION

The present invention relates to a guide rail for a window regulator and a slide-guide mechanism employing the same, and more particularly to a guide rail for the window regulator which is rigid in spite of being made of a thin metal sheet and to a slide-guide mechanism for a window regulator employing the light guide rail in which play is small when it moves slidably.

Hitherto, a slide-guide mechanism comprising a bracket secured to a window glass and a guide rail secured to a door of an automobile, or the like is employed as a window regulator of an automobile, or the like. In such a slide-guide mechanism, the bracket is slidably moved by a wire secured to the bracket and extending in longitudinal direction of the guide rail and by a driving mechanism for winding up or off the wire. In such a guide rail for a window regulator, a guide rail having a C-shape in section (FIG. 6) is well known. The guide rail is formed out of a thin hoop sheet 101 (e.g. 1.2 millimeters in thickness) by bending both side edges 101a in the same direction and at right angle with the hoop sheet 101, and further bending inside edges 101b of the side edges 101a in almost parallel to the hoop sheet. In the case of the window regulator having such a guide rail, the rigidity for guiding the window glass is not sufficient. More particularly, such a guide rail has a disadvantage that the rigidity against the bending moment around the binormal axis of the window glass is not sufficient. Thereby, when it is used in the type of the window in which the window glass is not guided by a window frame, there is a defect that the window glass tends to incline forward. Therefore, an increase in the rigidity of the guide rail for the window regulator is needed. On the other hand, a guide rail (FIG. 7) having a U-shape in section suggested by U.S. Pat. No. 3,427,748 is also known. The guide rail is formed out of a thick hoop sheet 111 (e.g. 2.0 millimeters in thickness) by bending side edges 111a in the same direction and at right angle with the hoop sheet 111. However, it has disadvantages that the guide rail is heavy and the cost of the material is expensive.

Also, as a slide-guide mechanism employed in the window regulator, the slide-guide mechanism comprising said guide rail 101 having C-shape in section and the bracket 102 having slide shoes 106 which are arranged so as to enclose the guide rail is known. However, it is difficult to accurately keep the distance L (FIG. 8) between the side edges of such a guide rail due to the limitation of the processing method, because the side edges 104 of effective guiding faces are processed by press-forming or roll-forming. Therefore, it is required to provide a proper clearance C (FIG. 8) between the bracket and the guide rail, so that the bracket can slidably move along the guide rail. In the case that the window glass is slidably guided by a sash, the problems are few. However, in the not-sufficiently-guided window glass, e.g. a trapezoid-shaped window glass of a front door of an automobile or a window glass of a hard-top car having no center pillar, the clearance mentioned above causes play in the window glass. Particularly, because the window glass of the front door is guided only by the rear sash, the window glass tends to incline forward. Therefore, noise generated by the vibration of a running automobile can be annoying to the passengers. Further, the not-sufficiently-guided window glass has a disadvantage that the vibration can damage the window regulator or the sash.

The slide-guide mechanism in which the above-mentioned disadvantages are eliminated is suggested by U.S. Pat. No. 3,427,748, as shown FIG. 9. This suggested mechanism comprises a guide rail 201 of L-shaped section and a bracket 202 having a slide member 206 provided with a slit 207 which has the width almost equal to the thickness of a guide member 204, i.e. the thickness of the metal sheet of the guide rail 201. Because the thickness of the guide member 204 is equal to that of the metal sheet of the guide rail 201, this mechanism has an advantage that the thickness is very accurate and thereby the clearance can be decreased to the minimum necessary. However, this mechanism does not have sufficient rigidity, particularly against the bending moment around the binormal axis of the window glass. Therefore, the thickness of the plate is required to be more thickened for giving the sufficient rigidity than that needed to certainly guide the window glass. Therefore, this mechanism has disadvantages that the cost and the weight of the whole slide-guide mechanism increase.

OBJECT OF THE INVENTION

An object of the present invention is to provide a rigid guide rail for a window regulator.

The other object of the invention is to provide a light slide-guide mechanism in which the play is small when it moves slidably.

Other objects and advantages of the invention will become apparent from the following description with reference to the accompanying drawings.

BRIEF DESCRIPTION OF THE DRAWING

FIG. 4b is a sectional view taken along line Y—Y of FIG. 4a;

DETAILED EXPLANATION OF THE INVENTION

Figure 1:
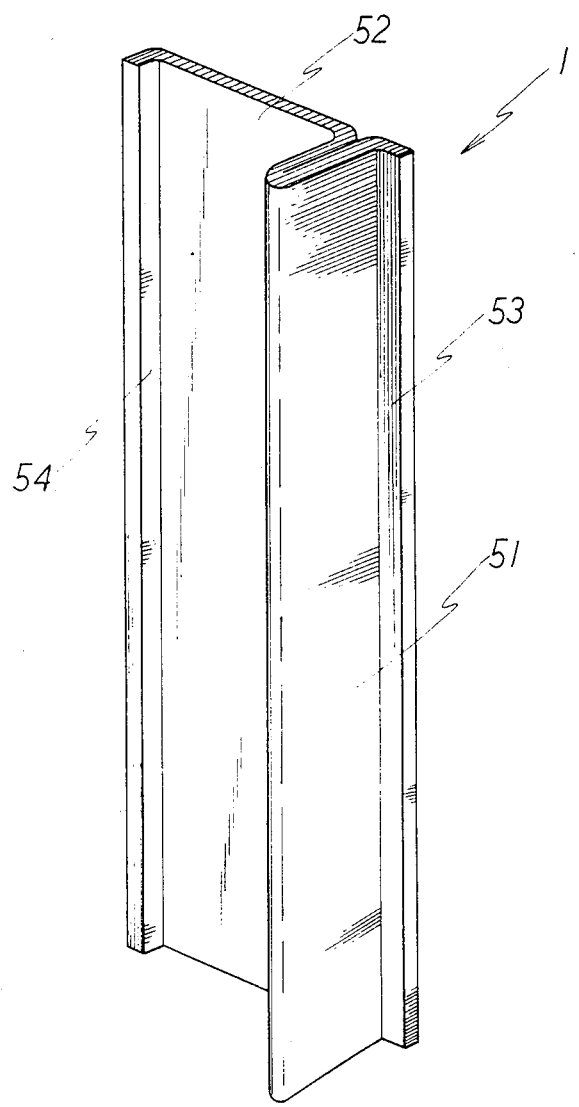
FIG. 1 is a perspective view for showing an embodiment of a guide rail of the present invention.

In FIG. 1, 1 is a guide rail. 51 is a double-bending portion. The double-bending portion 51 is raised rectangularly to the hoop plate 52, at the neighborhood of the one side edge thereof. A flat portion 53 continues to the double-bending portion 51. Further, a lip portion 54 extends in the same direction as the double-bending portion 51 extends.

Figure 2:
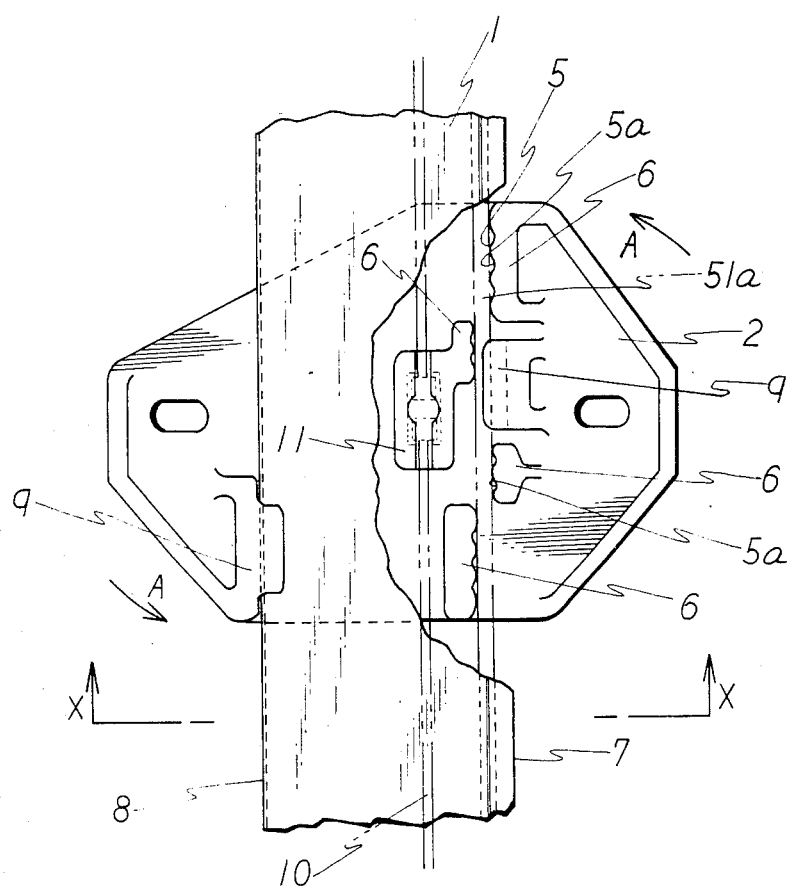
FIG. 2 is a front view partially broken away for showing a slide-guide mechanism employing the guide rail shown in FIG. 1.
Figure 3:
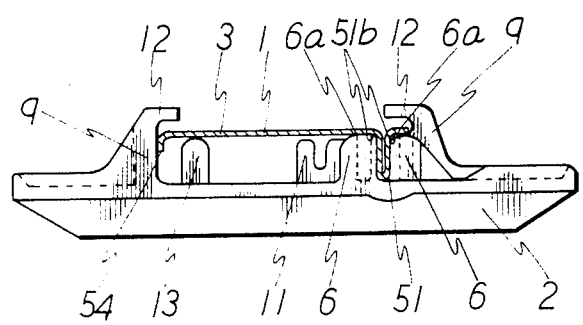
FIG. 3 is a sectional view taken along line X—X of FIG. 2.

As shown in FIGS. 2 to 3, a slide-guide mechanism employing the guide rail of the invention comprises the guide rail 1 and a bracket 2 guided slidably along the guide rail 1. The bracket 2 has four slide shoes 6 which are arranged alternately so as to provide a space 51a to pass through the double-bending portion 51 and are provided with oil grooves 5a on side faces 5 which can come into contact with the double-bending portion 51. Two further guide shoes 9 are provided at the position in relation to both side margins 7, 8 of the guide rail 1 and have a side face to guide secondarily the side margins 7, 8. A fitting member 11 is provided for securing a wire 10 extending in the longitudinal direction of the guide rail 1. In the application of the present invention, the wording "to guide secondarily" means not to touch or not to guide efficiently in ordinary use and to prevent the deflection of the guide rail beyond the limited degree and to keep the stable guide function thereby.

Furthermore, the bracket 2 is provided with a claw member 12 on the top of the guide shoe 9 in order to prevent the bracket 2 from separation from the guide rail 1. The bracket 2 is also provided with a projection 13 in order to keep the proper interval and hold the bracket barallet against the guide rail 1.

Figure 4A:
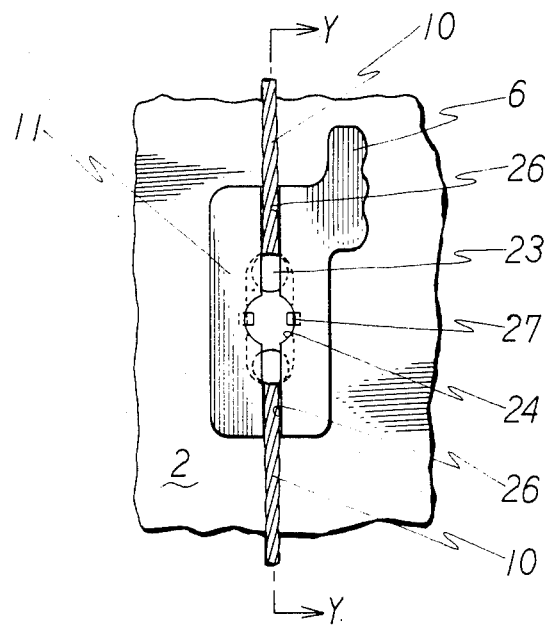
FIG. 4a is an enlarged front view for showing a wire fitting member in the invention.
Figure 4B:
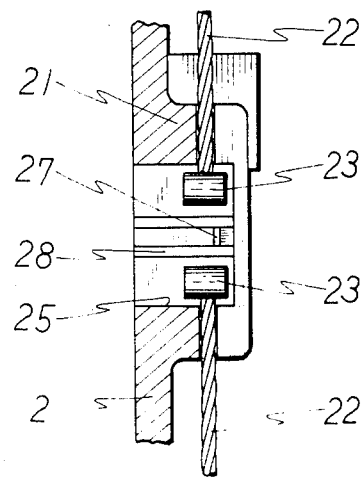

Furthermore, as shown in FIGS. 4a to 4b, the wire fitting member 11 is provided on the bracket 2 as one body of a projection 21 projected from the bracket 2. The projection 21 has a bore 24 through which a fastenner 23 of the wire 10 can be inserted; a space 25 jointed to the bore 24, in which the fastenner 23 can be accommodated; and a wire groove 26 through which the wire 10 can be inserted. Also, elastic projections 27 are formed on the inner walls 28 of the space 25. It is desirable that the wire fitting member 11 be structured as above, because the operation of engaging the wire 10 to the bracket 2 is extremely easy and the wire 10 once engaged does not slip out.

Also, in the guide rail 1 of the above described embodiment, the double-bending portion 51 is provided near the side edge of the guide rail 1. However, such a limitation is not necessary for the invention. A guide rail having the double-bending portion near the center (FIGS. 5f to 5h) or at the side edge (FIG. 5a, FIG. 5c, FIG. 5d and FIG. 5i), or the like can be optionally selected.

Figure 5A:
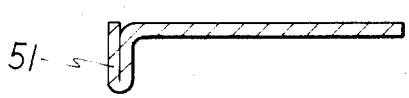
FIGS. 5a to 5i are transverse sectional views for showing other embodiments of the guide rail of the invention.
Figure 5B:
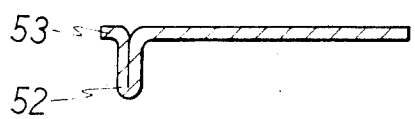
Figure 5C:
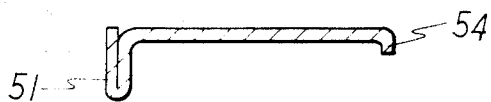
Figure 5D:
Figure 5E:
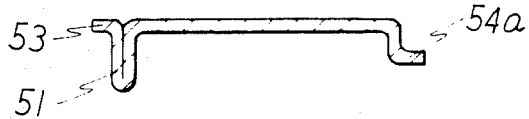
Figure 5F:
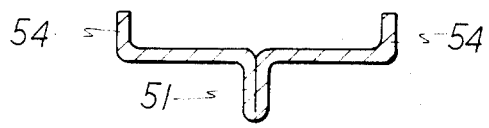
Figure 5G:
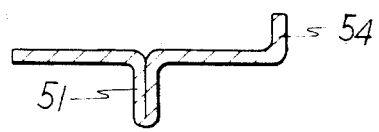
Figure 5H:
Figure 5I:
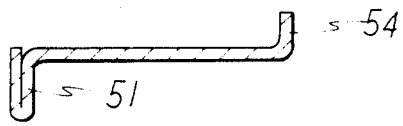

Also, the guide rail 1 of the above described embodiment has formed the lip portion 54 and the flat portion 53. However, these can be omitted depending on a scale of load or a purpose of use as shown in FIGS. 5a and 5b. The number, the shape or the direction of the lip portion 54 can be optionally selected depending on the situation for use of the guide rail. For example, a lip portion 54a as shown in FIG. 5d can be selected. The various combinations of them can be optionally employed as shown in FIGS. 5a to 5i.

In the guide rail of the present invention, the double-bending portion 51 which guides the bracket directly and efficiently has about double thickness of the metal sheet of the guide rail. Therefore, the rigidity of the double-bending portion 51 is especially high. Moreover, the rigidity against the bending moment (direction A of FIG. 2) around the binormal axis of the window glass is high especially. Furthermore, the double-portion 51 can fit with the bracket and can surely guide the bracket, because of elasticity thereof.

Figure 6:
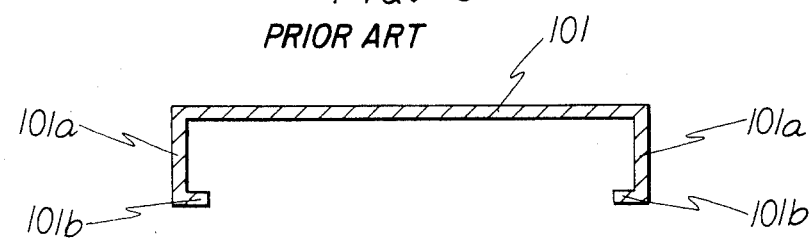
FIGS. 6 to 7 are transverse sectional views for showing conventional guide rails.
Figure 7:
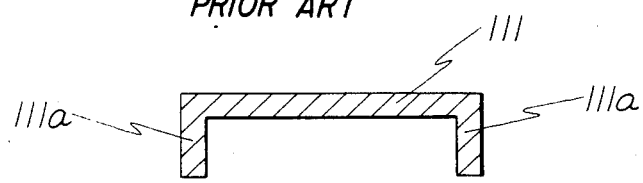
Figure 8:
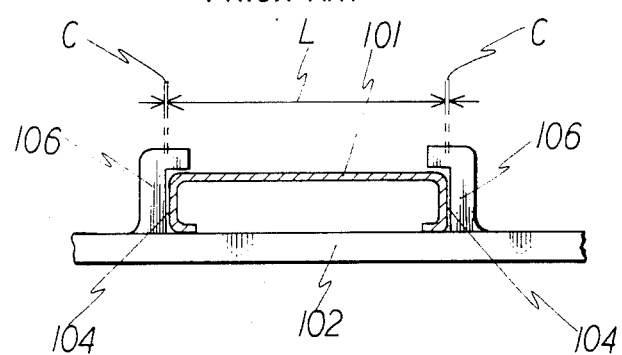
FIGS. 8 to 9 are transverse sectional views for showing the principal portion of conventional slide-guide mechanisms, respectively.
Figure 9:
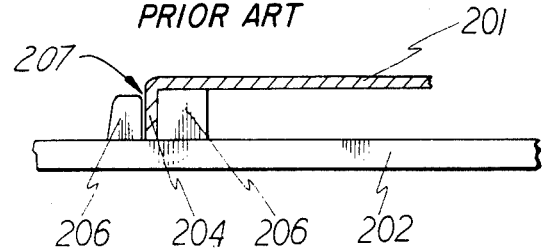

Because the plate is folded in double, the thus structured guide rail has higher rigidity than the guide rail of the prior art (FIG. 6) which is the same in thickness and which is made of the same material. For example, when a torque of 2.8 kgf·m is exerted on one edge of the guide rail made of a galvanized steel sheet which is 1.2 millimeters in thickness and 700 millimeters in length, the angle of deflection of the conventional guide rail shown in FIG. 6 comes to 1.02 degrees. In contrast thereto, under the same conditions, in the present embodiment has an angle of deflection of 0.327 degrees which is very small. Such a guide rail of the present invention has an advantage that the rigidity is high in spite of its thickness. Further, the rigidity of the present embodiment is higher than that of the conventional guide rail (FIG. 7) which has double the thickness (the angle of deflection is 0.409 degrees under the same conditions as above). Simultaneously, it is apparent that the cost of materials is reduced. Also, the guide rail of the invention is light in weight because the thickness of the sheet is thin. As a result, the invention has an advantage that the light guide rail can contribute for cutting the weight of an automobile which results in saving of energy which is strongly desired recently.

As shown in FIGS. 2 to 3, the thus structured guide rail 1 and the bracket 2 are combined by inserting the double-bending portion 51 into the space 51a between the slide shoes 6. A fitting fastenner fixed at both edges of two wires 10 or the center portion of one wire 10 is engaged to the wire fitting member 11 of the bracket 2, and the bracket 2 is slidable along the guide rail 1 with driving of the wire thereby. In the ordinary slide, the guide rail 1 and the bracket 2 come in contact slidably by the contact of both side faces of the double-bending portion 51 and the side face 5 of the slide shoes 6 and by the contact of root portions 51b of the double-bending portion 51 and top portions 6a of the slide shoes 6.

In the slide-guide mechanism of the present invention, there is little clearance between both side faces of the double-bending portion 51 and the side faces 5 of the slide shoes 6. They are substantially in a fitting state. Therefore, play is not generated, when the vibration is given from the outside or when the bracket 2 is slidably moving along the guide rail 1. Also, because an oil groove 5a is provided in the side face 5, oil which is held in the oil groove 5a makes up proper oil film. Therefore, the bracket 2 is extremely smoothly slidable along the guide rail 1. Also, because the double-bending portion 51 is formed from one metallic sheet by bending, the double-bending portion 51 serves as a spring and the fitting state in the side face 5 and the double-bending portion 51 can be properly kept. Further, because the slide shoes 6 are arranged alternately, in the case that torque is exerted on the bracket 2, the reaction force of respective slide shoes 6 is small and the frictional resistance resulting from the force is extremely small. Especially, because the top and bottom slide shoes which are arranged at a distance receive the torque of the direction A, the torque is surely received by the slide shoes 6. Accordingly, in the window glass (not shown) guided with only one side by the sash, or the like according to selecting the direction to set the bracket 2, it can be suitably prevented that the window glass inclines to the side at which the window glass is not guided.

The linear guide rail 1 is shown in FIGS. 2 to 3. However, in the case of employing the curved window glass, there is no doubt that the guide rail 1 can be made in arc shape according to the curve.

As mentioned above, the guide rail and the slide-guide mechanism employing the same for a window regulator of the invention have many effects and have great utility.

What we claim is:

1. A guide device for a window regulator comprising a guide rail formed out of a hoop sheet, comprising a double-bending portion which is raised at almost right angle with said hoop sheet and in the longitudinal direction of said hoop sheet and a bracket securable to a window glass slidably guided on said guide rail, said double-bending portion having two outer surfaces which serve to guide said bracket.

2. The guide device of claim 1 wherein a lip portion is formed at least one side edge of said hoop sheet and is raised at almost right angle with said hoop sheet.

3. A slide-guide mechanism for guiding a window glass of window regulator, comprising
   (A) a guide rail which is formed out of a hoop sheet, having a double bending portion which is raised at almost right angle with said hoop sheet and in the longitudinal direction of said hoop sheet; and
   (B) a bracket which is secured to the window glass and is slidably guided along said guide rail by driving of a wire, having
   slide shoes arranged alternatingly along said double-bending portion of guide rail, and provided with an oil groove on a side face coming into contact with said double-bending portion;
   at least two guide shoes provided in relation to both side edges of said guide rail, and having a face for guiding both side margins secondary; and
   a fitting member for securing a wire extending in longitudinal direction of said guide rail.

4. The slide-guide mechanism of claim 3 wherein said guide rail has a lip portion extending from at least one side edge of said hoop sheet.

5. The slide-guide mechanism of claim 3 wherein said fitting member is a projection projected from the bracket 2 and having,
   a bore through which a fastenner of said wire is capable of being inserted;
   a space in which said fastenner is capable of being accommodated, being jointed to said bore; and
   a wire groove through which said wire is capable of being inserted.

6. The slide-guide mechanism of claim 5 wherein an elastic projection is formed at inner wall of said space.

* * * * *